United States Patent
Akl et al.

(10) Patent No.: US 12,068,954 B2
(45) Date of Patent: Aug. 20, 2024

(54) IP-BASED ROUTING SUPPORT IN IAB

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/451,807

(22) Filed: Oct. 21, 2021

(65) Prior Publication Data

US 2022/0131798 A1 Apr. 28, 2022

Related U.S. Application Data

(60) Provisional application No. 63/104,427, filed on Oct. 22, 2020.

(51) Int. Cl.
*H04L 45/74* (2022.01)
*H04L 47/2441* (2022.01)
(Continued)

(52) U.S. Cl.
CPC .......... *H04L 45/74* (2013.01); *H04L 47/2441* (2013.01); *H04W 28/0268* (2013.01);
(Continued)

(58) Field of Classification Search
None
See application file for complete search history.

(56) References Cited

U.S. PATENT DOCUMENTS

| 2011/0242978 A1 | 10/2011 | Klein et al. |
| 2019/0349834 A1 | 11/2019 | Teyeb et al. |

(Continued)

OTHER PUBLICATIONS

O. Teyeb, A. Muhammad, G. Mildh, E. Dahlman, F. Barac and B. Makki, "Integrated Access Backhauled Networks," 2019 IEEE 90th Vehicular Technology Conference (VTC2019-Fall), Honolulu, HI, USA, 2019, pp. 1-5, doi: 10.1109/VTCFall.2019.8891507. (Year: 2019).*

(Continued)

*Primary Examiner* — Lonnie V Sweet
(74) *Attorney, Agent, or Firm* — Procopio, Cory, Hargreaves & Savitch

(57) ABSTRACT

In an aspect of the disclosure, a method, a computer-readable medium, and an apparatus of a network node are provided. The network node may receive, from a second network node, a routing configuration that maps a packet to a routing identifier (ID) based on a first header in the packet. The network node may receive a packet from a pre-hop node, the packet including the first header with a first address and a second header with a second address. The network node may determine that the second address matches an address of the first network node and that the first address mismatches an Internet protocol (IP) address of the first network node. The network node may replace, based on the received routing configuration and based on the address match and address mismatch determination, the second header with a third header, the third header including the routing ID.

28 Claims, 14 Drawing Sheets

(51) Int. Cl.
  *H04W 28/02* (2009.01)
  *H04W 40/12* (2009.01)
  *H04W 40/22* (2009.01)
  *H04W 40/24* (2009.01)
(52) U.S. Cl.
  CPC ........... *H04W 40/12* (2013.01); *H04W 40/22* (2013.01); *H04W 40/24* (2013.01)

(56) References Cited

U.S. PATENT DOCUMENTS

| | | | |
|---|---|---|---|
| 2020/0146109 A1 | 5/2020 | Majmundar et al. | |
| 2021/0051512 A1 | 2/2021 | Hampel et al. | |
| 2021/0099385 A1 | 4/2021 | Huang et al. | |
| 2021/0105698 A1 | 4/2021 | Jactat | |
| 2021/0127319 A1 | 4/2021 | Huang et al. | |
| 2021/0259051 A1 | 8/2021 | Latheef et al. | |
| 2021/0282050 A1 | 9/2021 | Adjakple et al. | |
| 2022/0132391 A1 | 4/2022 | Akl et al. | |
| 2022/0166703 A1* | 5/2022 | Xu | H04L 61/5014 |
| 2022/0182917 A1 | 6/2022 | Muhammad et al. | |
| 2022/0225129 A1* | 7/2022 | Chen | H04W 24/04 |
| 2022/0225207 A1* | 7/2022 | Malkamäki | H04W 8/26 |
| 2022/0272564 A1* | 8/2022 | Teyeb | H04W 84/047 |
| 2022/0286841 A1* | 9/2022 | Mildh | H04L 61/5014 |
| 2022/0286938 A1* | 9/2022 | Wang | H04W 76/19 |
| 2022/0295335 A1 | 9/2022 | Tesanovic et al. | |
| 2023/0007732 A1 | 1/2023 | Zhang et al. | |
| 2023/0072379 A1 | 3/2023 | Cheng et al. | |
| 2023/0239757 A1* | 7/2023 | Huang | H04W 36/0005 370/331 |
| 2023/0269644 A1* | 8/2023 | Teyeb | H04W 36/10 370/331 |
| 2023/0362745 A1* | 11/2023 | Huang | H04W 40/22 |
| 2023/0379792 A1* | 11/2023 | Muhammad | H04L 45/74 |

OTHER PUBLICATIONS

3GPP TR 38.874: "3rd Generation Partnership Project, Technical Specification Group Radio Access Network, Study on Integrated Access and Backhaul (Release 15)", 3GPP Draft, TR 38.874 V0.7.0—Final—CLN, 3GPP, Mobile Competence Centre, Nov. 8, 2018, XP051591963, Nov. 28, 2018, pp. 1-111, Retrieved from Internet: URL: http://www.3gpp.org/ftp/Email%5FDiscussions/RAN2/[RAN2%23104]/[104%2326][IAB]%20TR%2038%2E874/TR%2038874%20v070%20%2D%20final%20%2Dcln%2Ezip. [Retrieved on Nov. 28, 2018] pp. 11-17, and pp. 27-99.

Qualcomm Incorporated: "IAB BAP Bearer Mapping", 3GPP TSG-RAN WG2 Meeting #106, 3GPP Draft, R2-1906417 IAB BAP Bearer Mapping, 3rd Generation Partnership Project (3GPP), Mobile Competence Centre, vol. RAN WG2, No. Reno, NV, USA, May 13, 2019-May 17, 2019, 3 Pages, May 13, 2019 (May 13, 2019), XP051729882, Retrieved from the Internet: URL: http://www.3gpp.org/ftp/Meetings%5F3GPP%5FSYNC/RAN2/Docs/R2%2D1906417%2Ezip [retrieved on May 13, 2019] the whole document.

International Search Report and Written Opinion—PCT/US2021/056343—ISA/EPO—Feb. 28, 2022.

Qualcomm (Rapporteur): "Email Discussion [108#51][IAB]: BAP Functional View", 3GPP Draft, 3GPP TSG-RAN WG2 Meeting #109-e, R2-2000481, 3rd Generation Partnership Project (3GPP), vol. RAN WG2, No. Electronic meeting, Feb. 24, 2020-Mar. 6, 2020 Feb. 13, 2020 (Feb. 13, 2020), pp. 1-7, XP051848556, Retrieved from the Internet: URL: https://ftp.3gpp.org/tsg_ran/WG2_RL2/TSGR2_109_e/Docs/R2-2000481.Zip R2-200048 Email Discussion on BAP Functional View_Summary.docx [Retrieved on Feb. 13, 2020], The whole document.

Qualcomm Incorporated: "Implications of RAN3 Agreements on IP Address Management for RRC Signaling and BAP Functionality", 3GPP Draft, R2-2004749, 3GPP, vol. RAN WG2, No. Online, Jun. 1, 2020-Jun. 12, 2020, May 21, 2020, 5 Pages, XP051887451, Retrieved from the Internet: URL: https://www.3gpp.org/ftp/TSG_RAN/WG2_RL2/TSGR2_110-e/Docs/R2-2004749.zip, R2-2004749 Implications of RAN3 agreements on IP address management for RRC signaling and BAP functionality.docx [retrieved on May 21, 2020], The whole document.

* cited by examiner

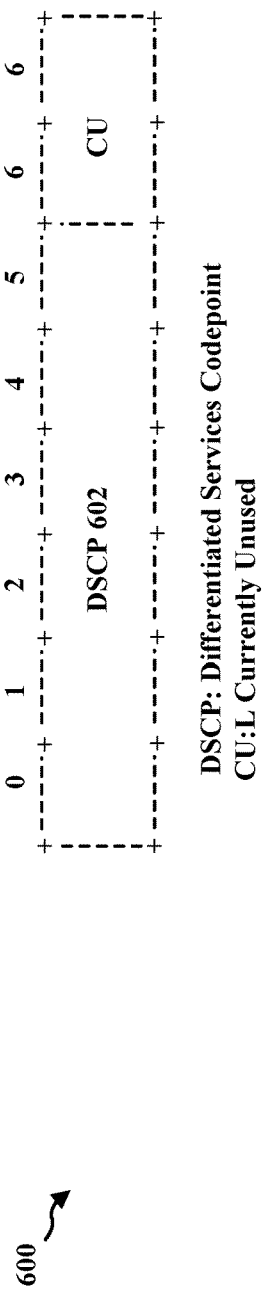
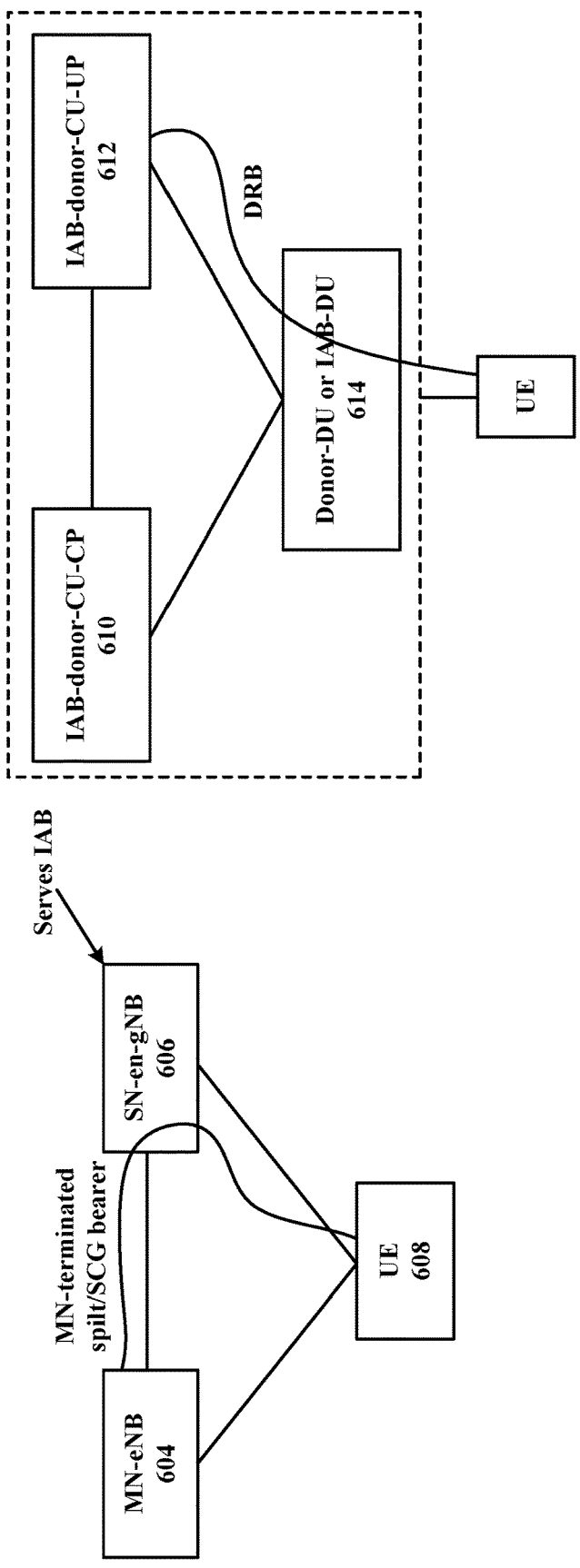
FIG. 6

IP-BASED ROUTING SUPPORT IN IAB

CROSS REFERENCE TO RELATED APPLICATION(S)

This application claims the benefit of and priority to U.S. Provisional Application Ser. No. 63/104,427, entitled "IP-BASED ROUTING SUPPORT IN IAB" and filed on Oct. 22, 2020, which is expressly incorporated by reference herein in its entirety.

BACKGROUND

Technical Field

The present disclosure relates generally to communication systems, and more particularly, to a wireless communication network with an integrated access and backhaul (IAB) network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus of a first network node are provided. The network node may receive, from a second network node, a routing configuration that maps a packet to a routing identifier (ID) based on a first header in the packet. The network node may receive a packet from a pre-hop node, the packet including the first header with a first address and a second header with a second address. The network node may determine that the second address matches an address of the first network node and that the first address mismatches an Internet protocol (IP) address of the first network node. The network node may replace, based on the received routing configuration and based on the address match and address mismatch determination, the second header with a third header, the third header including the routing ID.

In an aspect of the disclosure, a method, a computer-readable medium, and an apparatus of a second network node are provided. The network node may configure a first network node to perform a mapping of a packet for at least an incoming route to the first network node based on one or more header fields. The network node may transmit, to the first network node, a routing configuration that maps a packet to a routing ID based on the one or more header fields.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram illustrating QoS mapping information within an IAB network.

DETAILED DESCRIPTION

Figure 1:
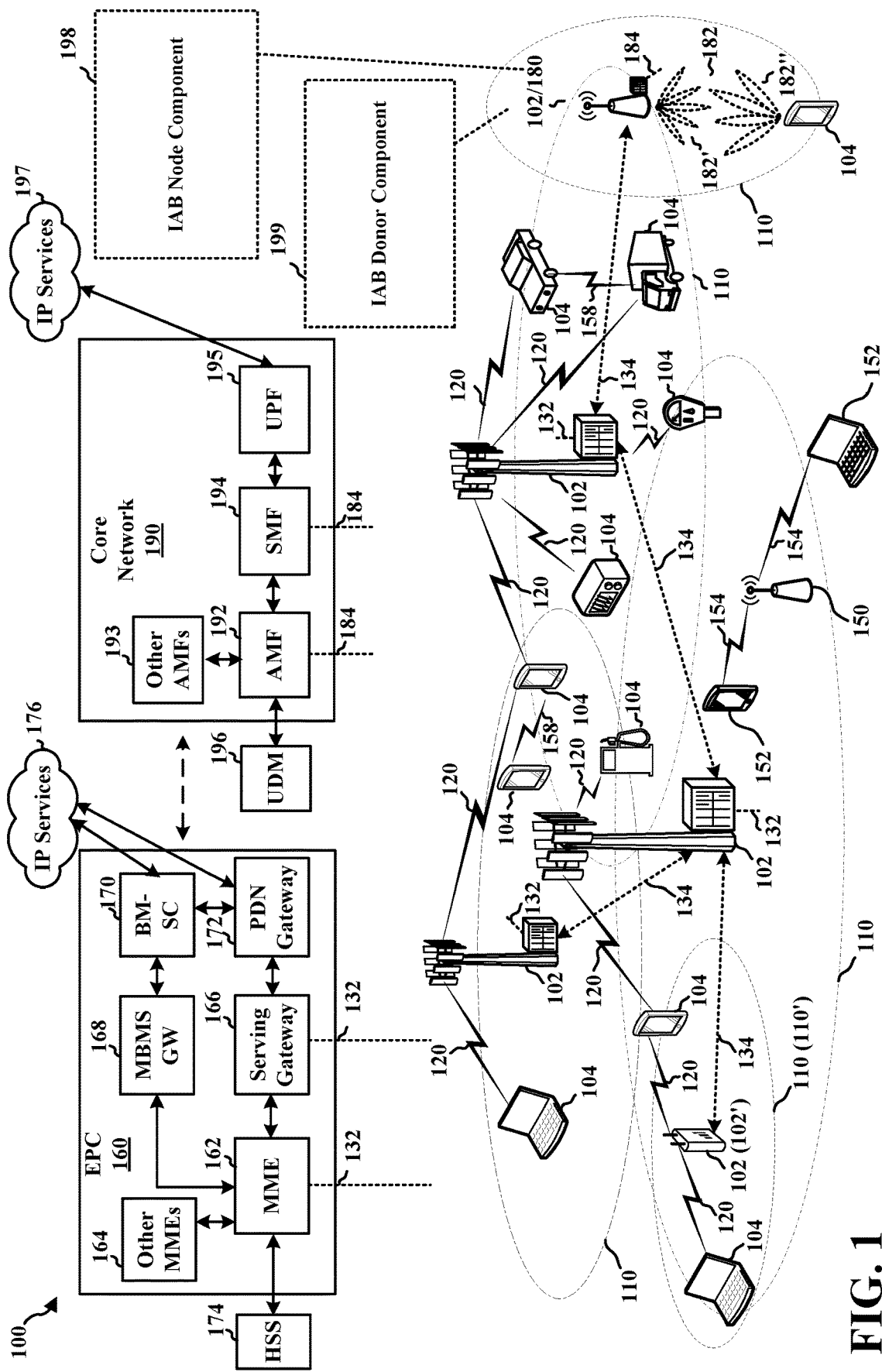
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node network node (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 180 may include an IAB node component 198. The IAB node component 198 may be configured to receive, from a second network node, a routing configuration that maps a packet to a routing ID based on a first header in the packet. The IAB node component 198 may be configured to receive a packet from a pre-hop node, the packet including the first header with a first address and a second header with a second address. The IAB node component 198 may be configured to determine that the second address matches an address of the first network node and that the first address mismatches an IP address of the first network node. The IAB node component 198 may be configured to replace, based on the received routing configuration and based on the address match and address mismatch determination, the second header with a third header, the third header including the routing ID. The base station 180 may include an IAB donor component 199. The IAB donor component 199 may be configured to configure a first network node to perform a mapping of a packet for at least an incoming route to the first network node based on one or more header fields and transmit, to the first network node, a routing configuration that maps a packet to a routing ID based on the one or more header fields.

Although aspects of the following description may be focused on 5GNR, the concepts described herein may be applicable to other similar areas, such as LTE, LTE-A, CDMA, GSM, and other wireless technologies.

Figure 2:
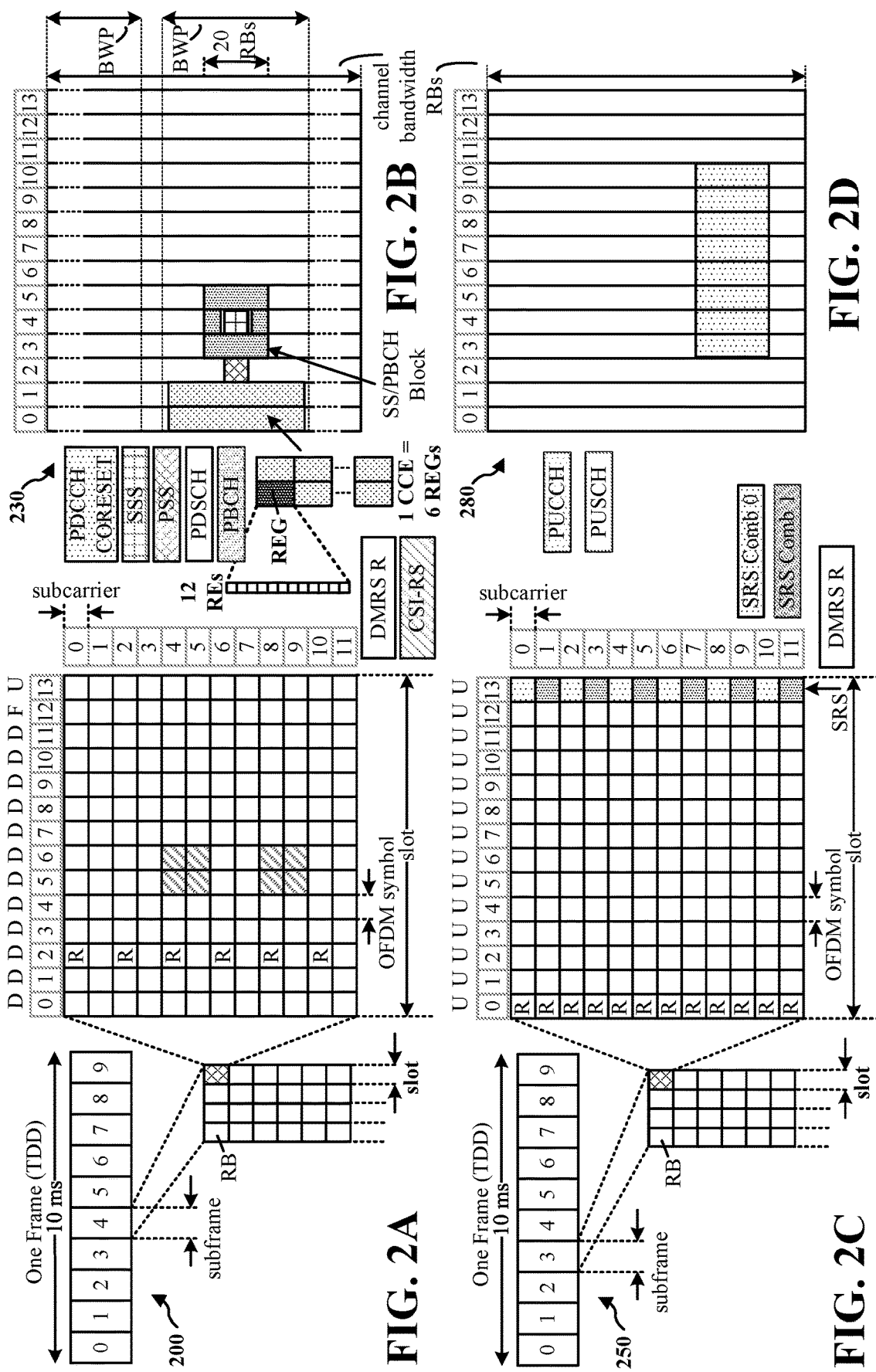
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
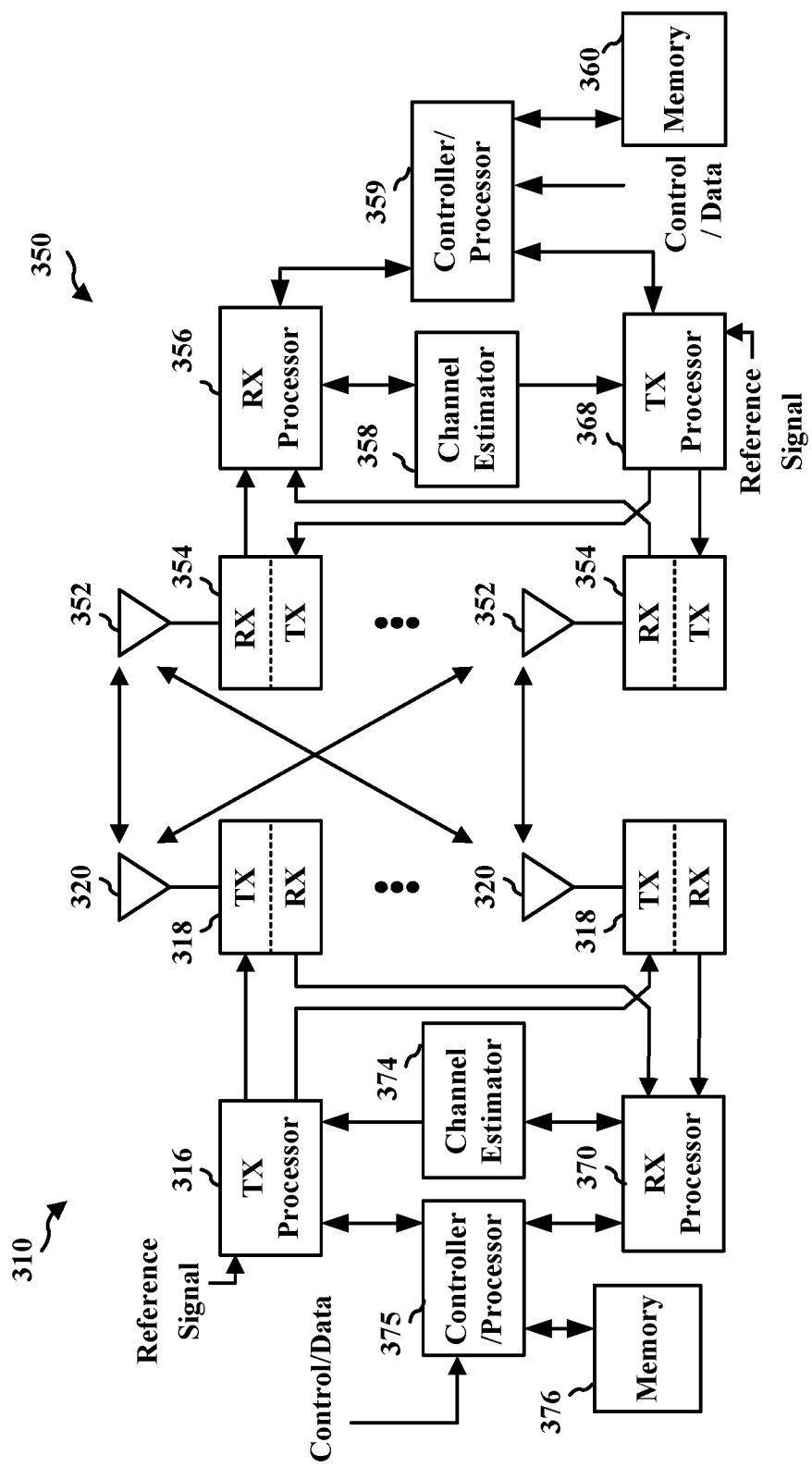
FIG. 3 is a diagram illustrating an example of a base station and user equipment (UE) in an access network.

FIG. 3 is a block diagram of a first wireless device in communication with a second wireless device. For example, the first wireless device may be a wireless device 310 in communication with a UE 350 in an access network. In some examples, the first wireless device 310 may be an IAB node in communication with a UE 350. In other examples, the first device may be a parent IAB node (e.g., an IAB node DU) and the second wireless device may be a child IAB node (e.g., an IAB node MT). In some examples, the first wireless device may be an IAB donor, and the second wireless device may be an IAB node. In some examples, the first wireless device may be an IAB donor, and the second wireless device may be an IAB donor.

Although the aspects in FIG. 3 are described in connection with a base station and a UE, the concepts are applicable to communication between other wireless devices. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the wireless device 310. These soft decisions may be based on channel estimates computed by the channel estimator 358. The soft decisions are then decoded and deinterleaved to recover the data and control signals that were originally transmitted by the wireless device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the wireless device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer ofupper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the wireless device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the wireless device 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
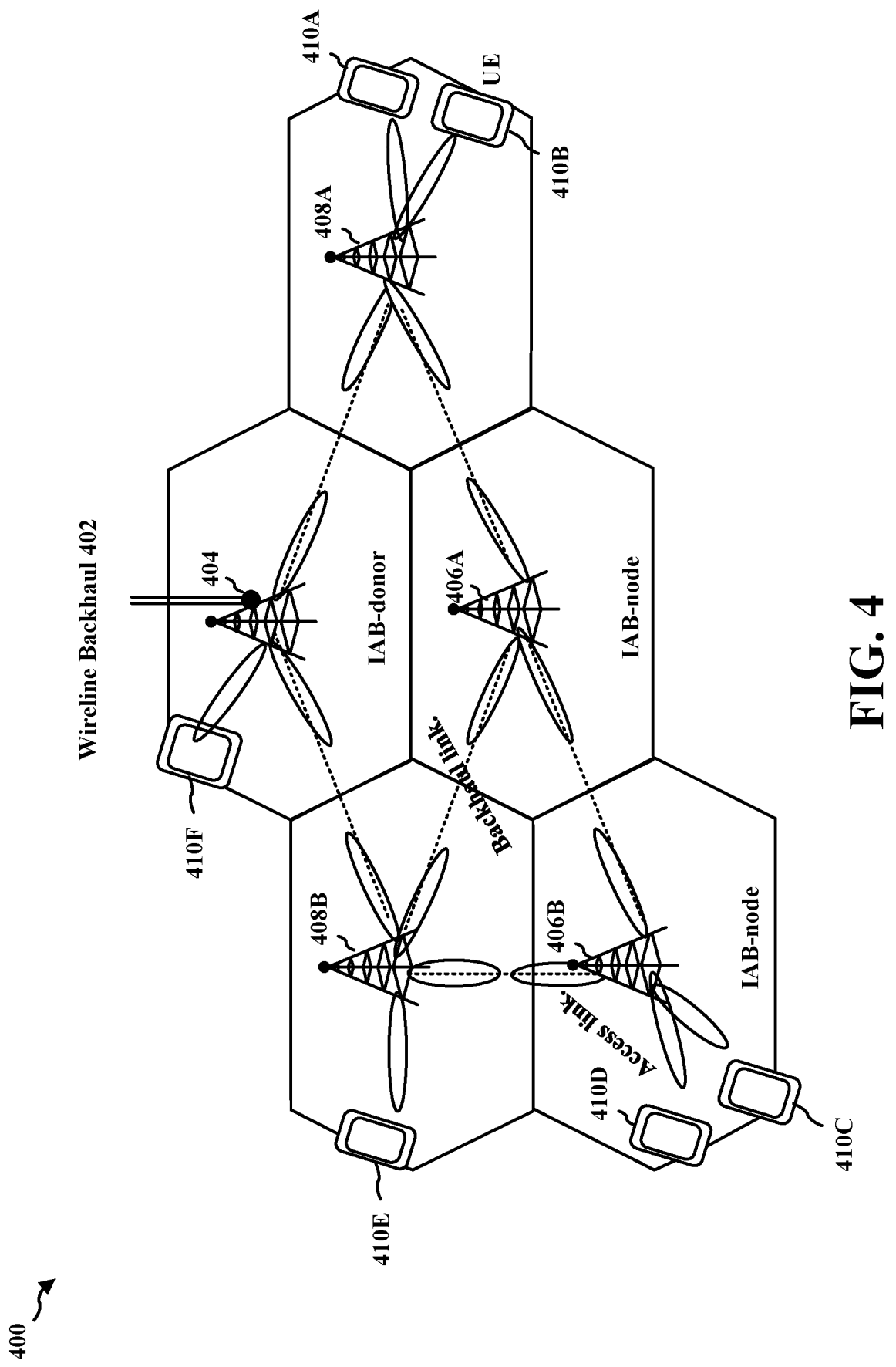
FIG. 4 is diagram illustrating an IAB network.

FIG. 4 is a first diagram illustrating an IAB network 400. The IAB network may provide access network functionality between access nodes (ANs) 404, 406A, 406B, 408A, 408B and ANs/UEs 410A, 410B, 410C, 410D, 410E, and 410F, and backhaul network functionality between the ANs. The ANs may include an IAB-donor 404, which has a wireline connection to the core network 402, and IAB-nodes 406A and 406B, which operate wirelessly and relay traffic to/from IAB-donors through one or more AN hops 408A and 408B. The IAB ANs may share resources between the access and backhaul. That is, the resources used for access communication between the ANs and ANs/UEs may also be used for backhaul communication between the ANs.

Figure 5:
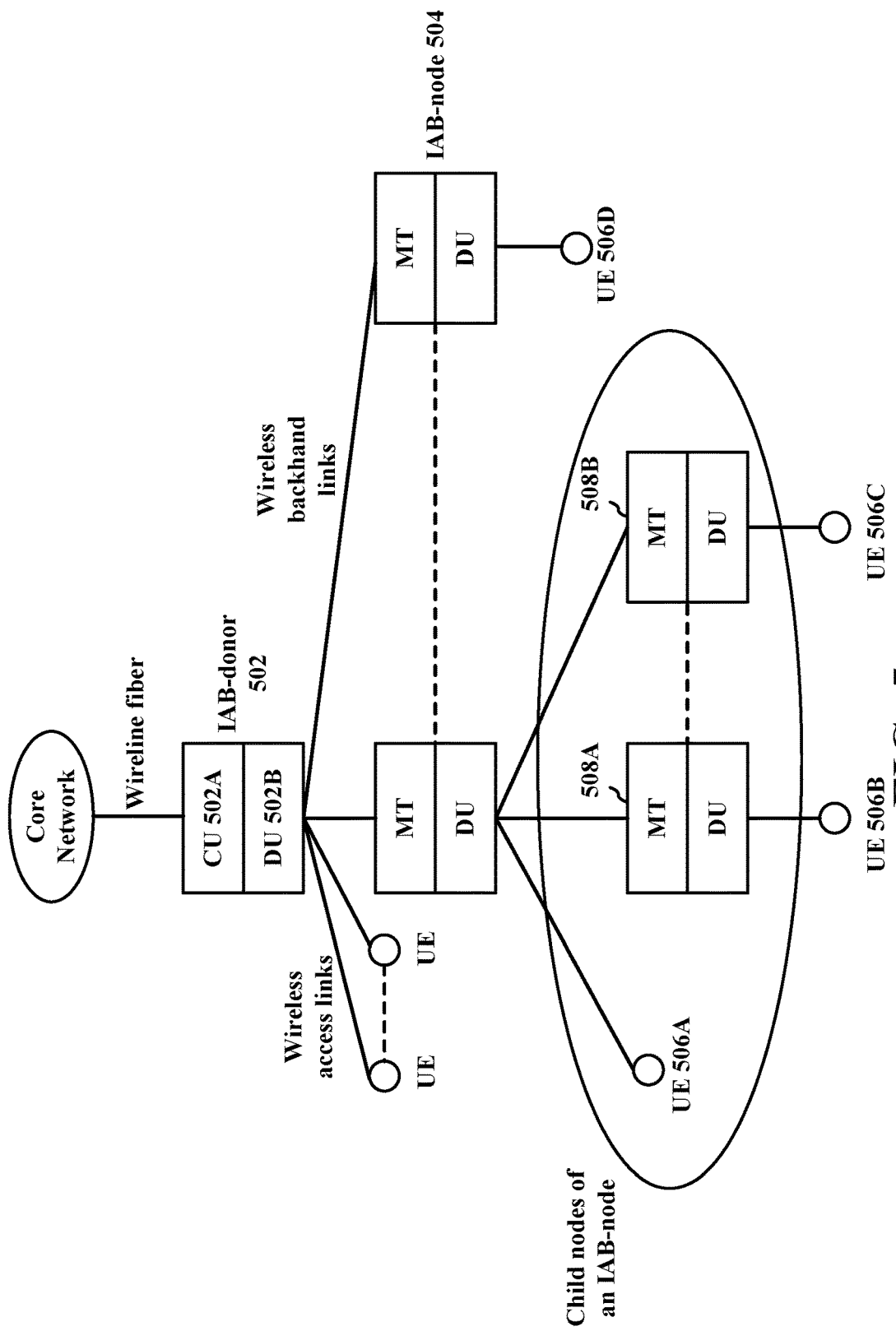
FIG. 5 is diagram illustrating an IAB network.

FIG. 5 is a second diagram illustrating an IAB network 500. In an IAB network, there may be two types of network nodes: IAB-donors (e.g., IAB-donor 502) and IAB-nodes (e.g., IAB-node 504). IAB-donors are an enhanced gNB with functions to control the IAB network. IAB-donors may include a central unit (CU) (e.g., CU 502A) that controls the whole IAB network through configuration. The CU may hold RRC and packet data convergence protocol (PDCP) layer functions. The IAB-donors may further include a distributed unit (DU) (e.g., DU 502B) that schedules child nodes (e.g., UEs 506A, 506B, 506C, 506D and/or ANs 508A, 508B) of the IAB-donor. The DU may hold radio link control (RLC), media access control (MAC), a physical (PHY) layer functions. The IAB-node 504 may be a layer 2 (L2) relay node that includes mobile termination (MT) and DU functions. The MT may be scheduled (similar to like a UE) by its parent IAB-node or IAB-donor. The DU may schedule child nodes (UEs and/or ANs) of the IAB-node.

FIG. 6 is a diagram illustrating quality of service (QoS) mapping information within an IAB network 600. The QoS mapping information includes a differentiated services codepoint (DSCP) 602 and an Internet protocol (IP) v6 (IPv6) flow label. Differentiated services are intended to provide a framework and building blocks to enable deployment of scalable service discrimination on the Internet. In the packet forwarding path, differentiated services (DS) are realized by mapping the DSCP contained in a field in the IP packet header to a particular forwarding treatment, or per-hop behavior (PHB), at each AN along its path. Six bits of the DS field may be used as the DSCP to select the PHB a packet experiences at each node. The two-bit CU field may be current reserved. The DSCP field may be defined as an unstructured field to facilitate the definition of future per-hop behaviors. With some exceptions, the mapping of DSCPs to PHBs may be configurable. A DS-compliant node may support the logical equivalent of a configurable mapping table from DSCPs to PHBs.

The IPv6 flow label (referred to herein as IP flow label) may include a 20-bit flow label field in the IPv6 header that is used by an AN to label packets of a flow. From the viewpoint of the network layer, a flow may be a sequence of packets sent from a particular source to a particular unicast, anycast, or multicast destination that an AN desires to label as a flow. A typical definition of a flow for this purpose is any set of packets carrying the same 5-tuple of {destination address, source address, protocol, destination port, source port}. There are cases in which the complete 5-tuple for all packets is not readily available to a forwarding AN, in particular for fragmented packets. In such cases, a flow can be defined by fewer IPv6 header fields, typically using the 2-tuple {destination address, source address}. The usage of the 3-tuple of the flow label, source address, and destination address fields may enable efficient IPv6 flow classification, where IPv6 main header fields in fixed positions are used. Packets may be processed in a flow-specific manner. To enable flow-label-based classification, source nodes may assign each unrelated transport connection and application data stream to a new flow.

As illustrated in FIG. 6, a UE 608 may be dual connected to a master node (MN) eNB 604 and a secondary gNB (an IAB-donor) 608 that manages IAB. For each requested E-UTRAN radio access bearer (E-RAB) configured as MN terminated split bearer/secondary cell group (SCG) bearer, if the QoS mapping information element (IE) is contained in the general packet radio service (GPRS) tunneling protocol (GTP) tunnel endpoint IE in the secondary gNB (SgNB) additional/modification request acknowledge message, the master eNB (MeNB) 604 (also referred to as MN-eNB) may, if supported, use the IE to set the DSCP and/or flow label fields for the downlink IP packets which are transmitted from the MeNB 604 to a secondary node (SN) enhanced gNB 606 (SN-en-gNB) (serving the IAB) through the GTP tunnels indicated by the GTP tunnel endpoint IE. The SN donor (e.g., 606) configures a mapping of the received packets from the MN-eNB 604 based on the IP header fields to a route via the IAB backhaul transport.

For each requested DRB, if the QoS mapping information IE is contained in the DL UP parameters IE in the bearer contact setup/modification request message, the gNB CU for user plane (UP) (gNB-CU-UP) may use the IE to set the DSCP and/or flow label fields in the downlink IP packets that are transmitted through the GTP tunnels indicated by the UP transport layer information IE. A downlink mapping may be configured at IAB-donor-DU based on the IP header fields to a BAP route and egress backhaul RLC channel.

A UE may be connected to an IAB-network. The IAB-donor may setup a DRB for the UE. The DRB flows between the IAB-donor-CU and the UE. In some aspects, the IAB-donor-CU may configure a downlink mapping at a donor-DU as previously described. In some aspects, the IAB-donor-CU may configure IP header fields with DSCP/IPv6 flow labels and may send packets to the donor-DU as previously described. In some aspects, the IAB-donor-CU may include the CU-CP 610 and one or more CU-Ups 612. In such aspects, a DRB flow between a CU-UP and the UE may be configured as previously described. The CU-CP may perform bearer setup per DRB at a CU-UP. The CU-CP may configure QoS mapping info at the CU-UP for each requested DRB as previously described. The CU-UP may also configure the IP header fields based on the QoS mapping info as previously described. The downlink mapping may be configured by the CU-CP at the donor-DU as previously described.

The IAB-donor CU may include a IAB-donor CU for the control plane (CP) (IAB-donor-CU-CP) and one or more IAB-donor CUs for the user plane (UP) (IAB-donor-CU- UPs). A DRB flow may be between a IAB-donor-CU-UP through a IAB-donor-DU or IAB-DU to/from a UE. The IAB-donor-CU-UP 612 inserts within an IP packet QoS mapping information, which includes the DSCP and the IP flow label. Based on the QoS mapping information, the IAB-donor-CU-CP 610 configures a routing path for the IAB-donor-DU 614, so when the IAB-donor-DU receives an IP packet, the IAB-donor-DU 614 may decide how to route the traffic.

Figure 7:
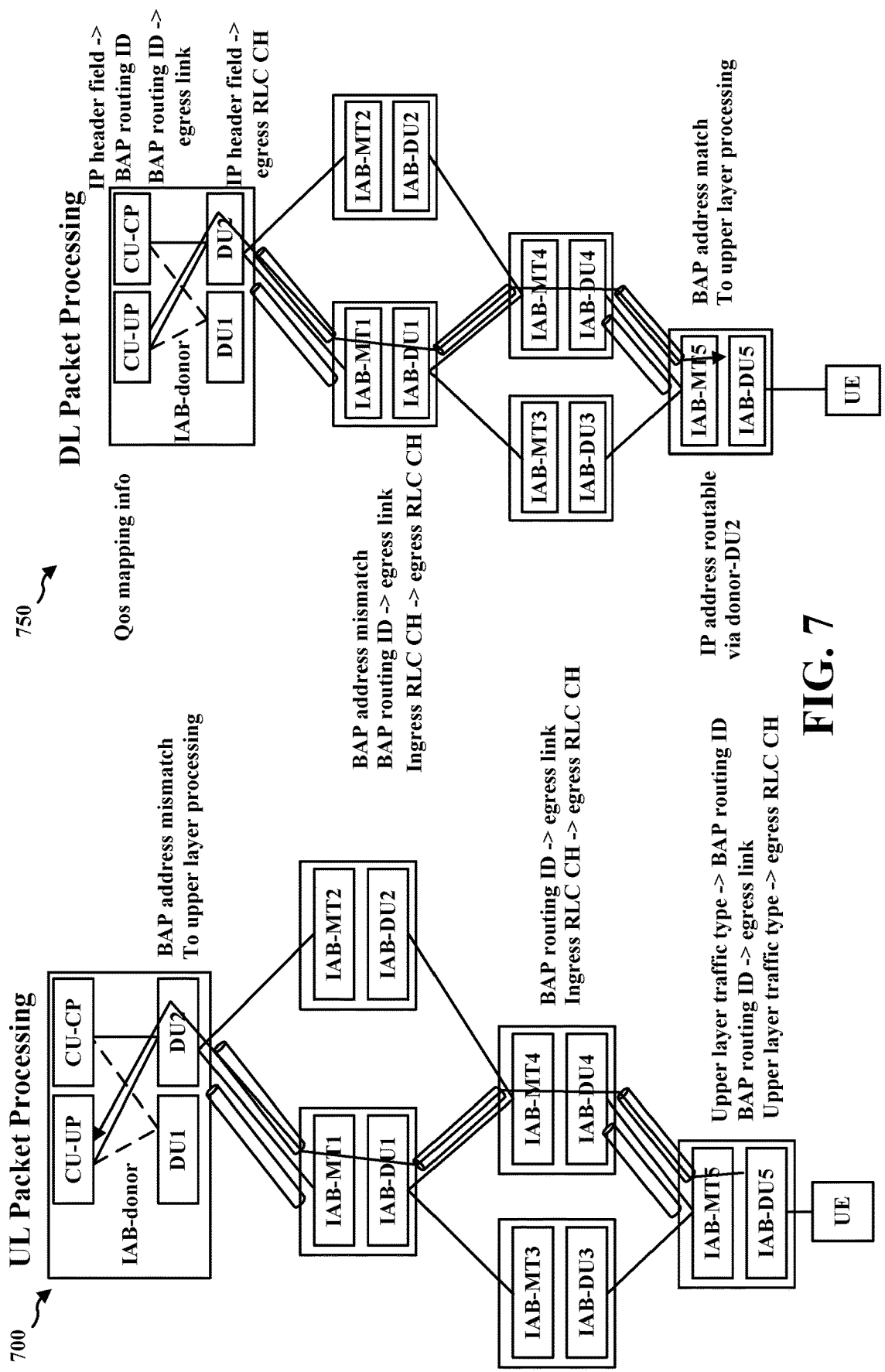
FIG. 7 is a diagram illustrating IP/BAP configurations.

FIG. 7 includes diagrams 700 and 750 illustrating aspects of IP/BAP configurations. As discussed supra, for DL packet processing in 750, the IAB-donor-CU[-UP] (e.g., IAB donor 1 702A or IAB donor 2 702B) inserts within an IP packet QoS mapping information, which includes the DSCP and the IP flow label. Based on the QoS mapping information, the IAB-donor-CU[-CP] configures a routing path for a downlink mapping at the IAB-donor-DU When the IAB-donor-DU receives an IP packet, the IAB-donor-DU may then decide how to route the traffic based on the IP header and the downlink mapping configuration. The downlink mapping configuration indicates a mapping between the IP header fields (destination IP address, DCSP and/IPv6 flow label) and a BAP routing ID. The IAB-donor-DU may insert a BAP header to the packet that carries the BAP routing ID. The IAB-donor-DU may further determines a routing configuration a mapping between the BAP routing ID and an egress link along which the IAB-donor-DU forwards the BAP packet. The IAP-donor-DU may further determine an egress RLC channel based on the IP header and the downlink mapping configuration. The IAP-donor-DU transmits the BAP packet to the IAB-node 1. The IAB-node 1 may determine that the BAP address, which may be part of the BAP routing ID and carried in the BAP header, does not match its own BAP address (i.e., there is a BAP address mismatch), and based on the BAP routing ID and a routing configuration, may determine the egress link for transmitting the BAP packet. Based on the ingress RLC channel and a channel mapping configuration, the IAB-node 1 determines the egress RLC channel. The IAB-node 1 then transmits the IP packet through the determined link and the egress RLC channel to the IAB-node 4. The same process is followed for IAB-node 4 and IAB-node 5, where IAB-node 5 determines a BAP address match, removes the BAP header, and forwards the IP packet to upper layer processing for transmission to a UE.

For UL packet processing in the diagram 700, based on the traffic type and an uplink mapping configuration, the IAB-node 5 determines a BAP routing ID, and inserts into a BAP header the BAP routing ID. Based on the BAP routing ID and a routing configuration, the IAB-node 5 determines an egress link, and based on the traffic type, determines an egress RLC channel. The IAB-node 5 may transmit the IP packet to the IAB-node 4 based on the determined egress link and egress RLC channel. The IAB-node 4 determines based on the BAP routing ID and a routing configuration the egress link, and based on the ingress RLC channel and a channel mapping configuration, determines the egress RLC channel. The IAB-node 4 transmits the BAP packet to the IAB-node 1 based on the determined egress link and egress RLC channel. The same process is followed by IAB-node 1, and the IP packet is ultimately received and processed by the IAB-donor where there is a BAP address match.

Figure 8:
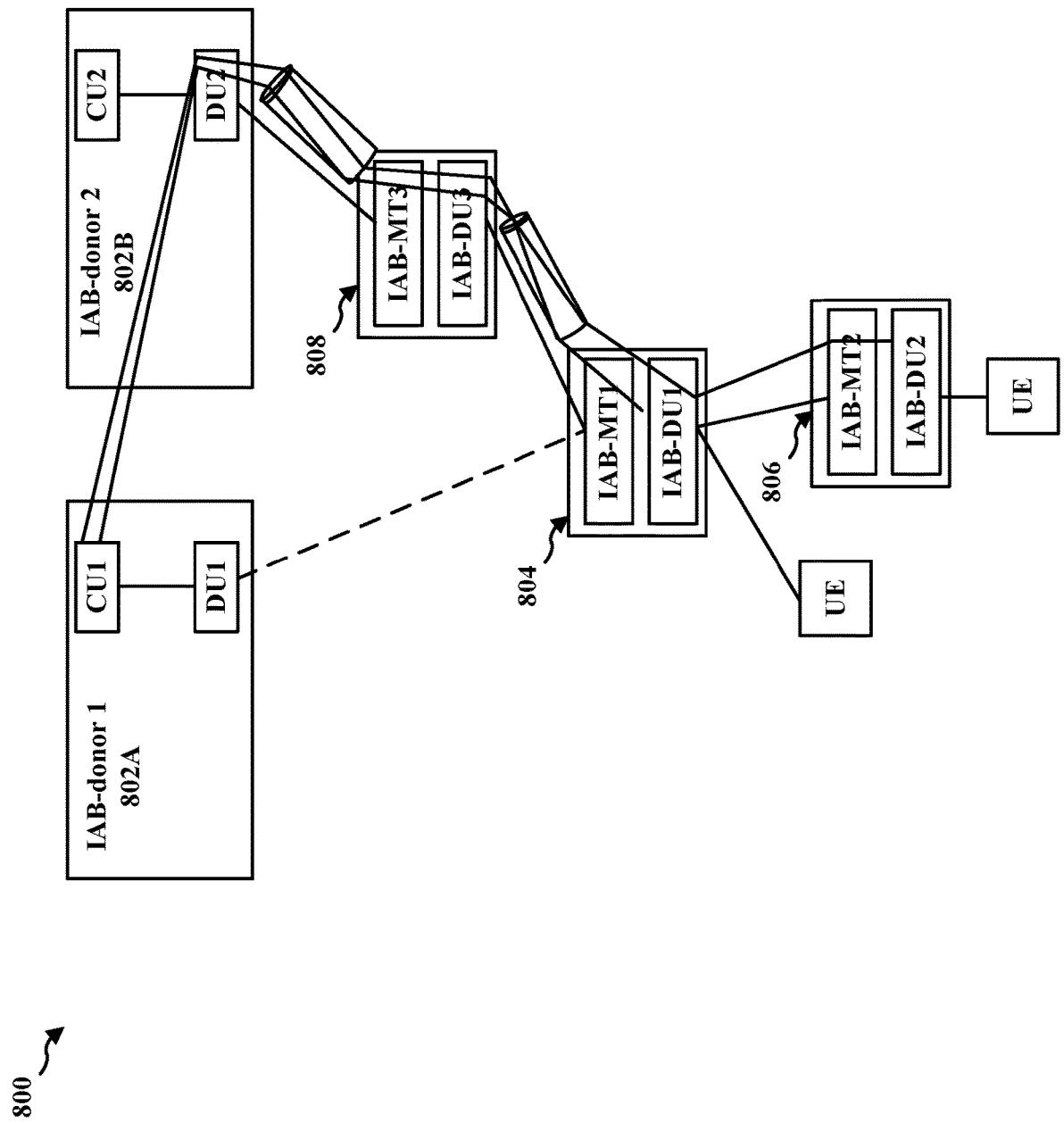
FIG. 8 illustrates example topological redundancy.

FIG. 8 illustrates an example topological redundancy diagram 800 for IAB donors. An IAB-node may be connected to one or more IAB-donors. As illustrated in FIG. 8, IAB-MT1 of IAB-node 1 804 may be dual-connected to CU1 of IAB-donor 1 802A and CU2 of IAB-donor 2 802B.

IAB-DU1 may be connected to the CU2 of the IAB-donor 2 802B. Children node of IAB-node 1, such as IAB-node 2 806 may be connected to CU1 of IAB-donor 1 802A. IAB-node 3 808 may be connected to the CU2 of the IAB-donor 2 802B. CU1 of the IAB-donor 1 802A may route F1-U traffic over a secondary path via a donor-DU associated with CU2 of the IAB-donor 2 802B to facilitate load-balancing or redundancy between the IAB-donors. The IAB-node 1 804 may perform routing and channel mapping based on IP header information. Similarly, a MT1 may be single-connected to parent DU3 808 and CU2 802B while IAB-node 1 and/or the UEs are connected to the first donor 802A. For example, for topology adaptation, MT1 may migrate from the first donor to the second donor, where at least one of the UEs or child/descendant MTs is not yet migrated to the second donor.

Figure 9:
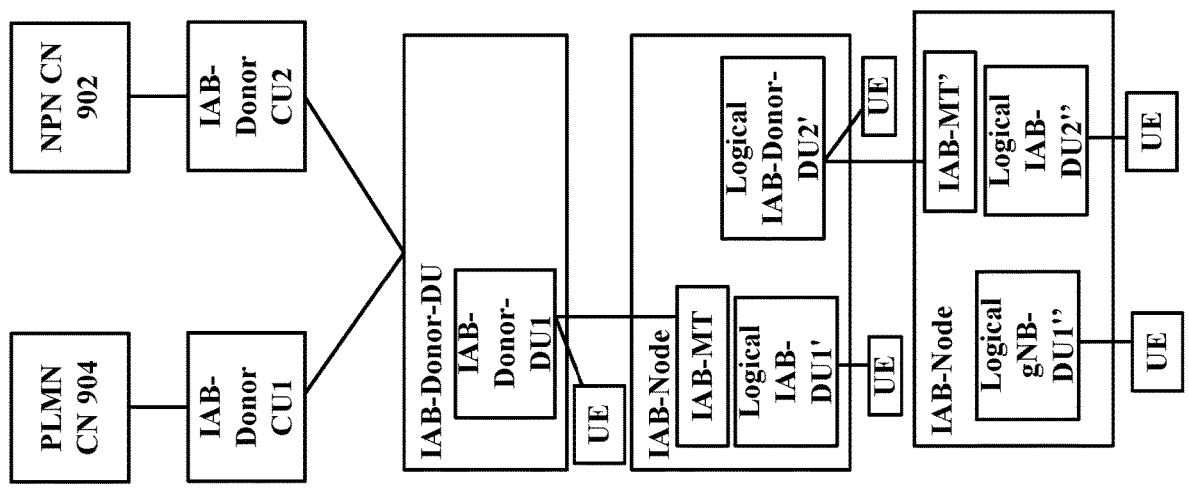
FIG. 9 illustrates example IAB radio access network (RAN) sharing.

As illustrated in example 900 of FIG. 9, a non-public network (NPN) 902 and a public land mobile network (PLMN) 904 may share the same RAN resources, which may include IAB and where the PLMN controls the inner IAB hops and the NPN controls the outer IAB hops. The PLMN 904 may be associated with a FWA operator, which may provide access to an enterprise or home using the inner IAB hops, while the NPN 902 may extend coverage within enterprise or home via the outer IAB hops. The PLMN 904 may provide wireless backhauling for in-train coverage via multiple hops while the NPN may represent an on-board local network using additional IAB hops at the boundary of the two IAB sections IAB-donor-CU2 may see the logical DU2 of the middle IAB-node as a wireline donor-DU. The boundary IAB-node may perform routing and channel mapping based on IP header information. A similar example holds where the RAN resources are shared by multiple PLMNs or multiple NPNs.

Figure 10:
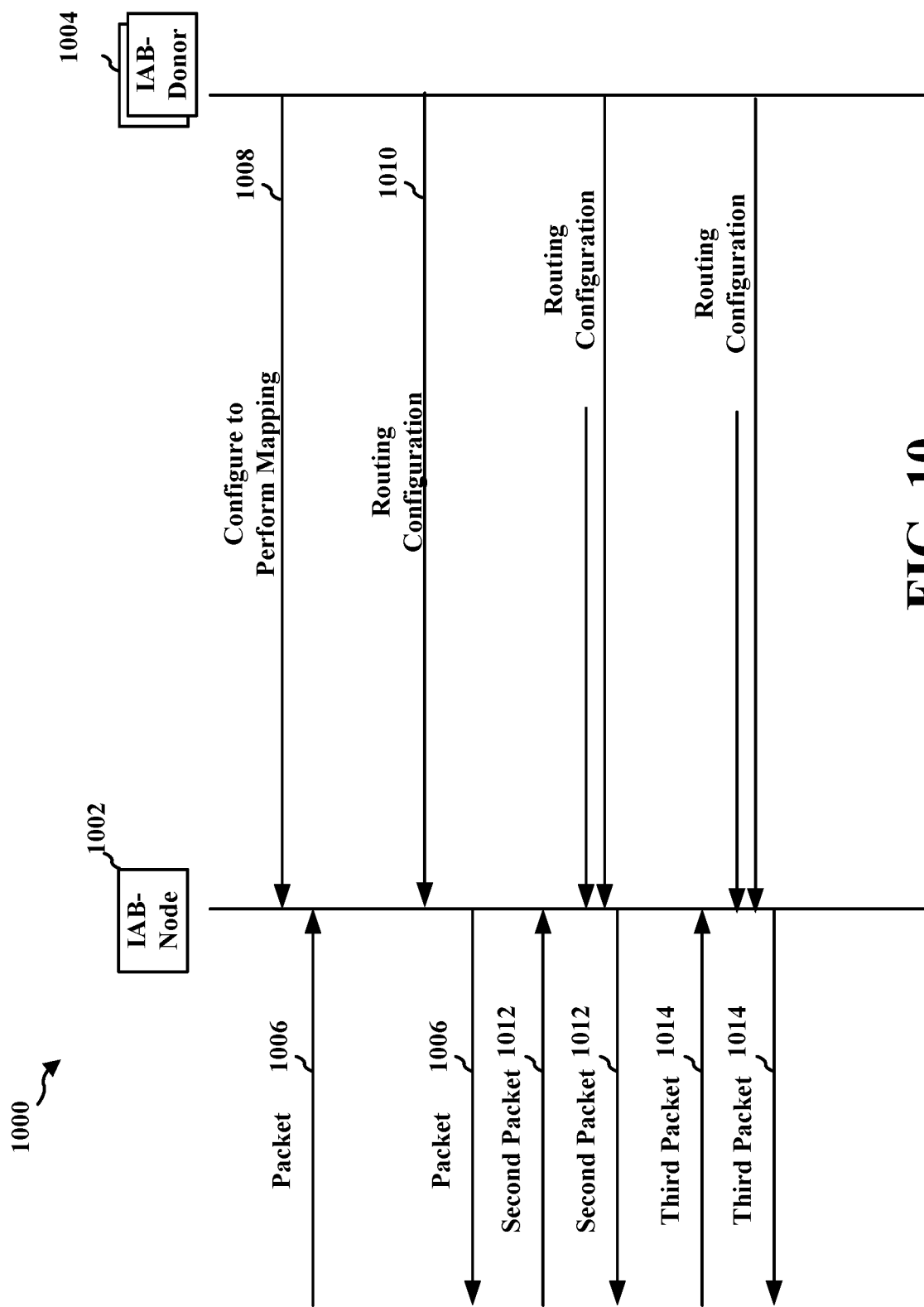
FIG. 10 illustrates example communications between IAB-donors and other network entities.

FIG. 10 illustrates an example communication 1000 between an IAB-node 1002 and one or more CUs of IAB donor(s) 1004. As illustrated in FIG. 10, the IAB-node 1002 may receive a packet 1006 from a pre-hope node. A packet passing from one node to another may be referred to as a "hop". For a node that receives and passes a packet, such as the IAB-node 1002 that receives and passes the packet 1006, the node in which the packet is received from may be referred to as a "pre-hop node" and the next node in which the packet is being forwarded to may be referred to as a "next-hop node". The IAB-node 1002 may identify a match of the packet's destination layer-2 address and a layer-2 address of the IAB-node 1002. The IAB-node 1002 may pass the packet 1006 to layer-3 processing based on the match of the layer-2 address. The IAB-node 1002 may identify a mismatch between the packet's destination layer-3 address and a layer-3 address of the IAB-node. The IAB-node 1002 may identify a next-hop node based on the packet's destination layer-3 address and a routing configuration. The IAB-node 1002 may pass the packet down to layer-2 processing based on the mismatch of the layer-3 address. The IAB-node 1002 may send the packet to the next-hop node.

CU of the IAB-donor(s) 1004 may configure (1008) the IAB-node 1002 to perform mapping of a packet based on layer-3 header information of the packet for at least an incoming route on which the packet is received by the IAB-node. The IAB-donor 1004 may provide a routing configuration 1010 that maps the packet to an outgoing route of the IAB-node 1002 based on layer-3 header information. The incoming route may include the pre-hop node. The outgoing route may include the next-hop node.

In some aspects, the layer-2 address may be a BAP address. In some aspects, the layer-3 address may be an IP address. In some aspects, the layer-3 header may be an IP header. In some aspects, the packet may be an upstream packet. In some aspects, the packet may be a downstream packet.

The IAB-node 1002 may receive a second packet 1012 with non-matching layer-2 address and may forward the second packet 1012 to a next-hop node based on a routing configuration. The IAB-node may receive a third packet 1014 with matching layer-2 address and layer-3 address and pass the packet to upper layer processing. In some aspects, the routing configuration may comprise a mapping to a next-hop node/layer-2 (BAP) address. In some aspects, the routing configuration may comprise a mapping to a BAP routing ID, a new destination layer-2 (BAP) address, a BAP path ID, or the like. In some aspects, the routing configuration may comprise a mapping to an egress backhaul radio link control (RLC) channel. In some aspects, the mapping(s) by the routing configuration (e.g., to next-hop node, BAP routing ID, BAP address, BAP path ID, or egress BH RLC channel) may be based on at least one of a packet destination layer-3 address or a packet layer-3 header field such as DSCP field or IPv6 flow label field. The layer-3 header information may include a packet destination layer-3 address, a DSCP field, or an IPv6 flow label field.

In some aspects, the routing configuration may also be based on a Layer-2 (BAP) address of the pre-hop node, a BAP routing ID or BAP path ID in the layer-2 (BAP) header of the packet received by the IAB-node, or an ingress backhaul RLC channel between the IAB-node and the pre-hop node. In some aspects, the IAB-donor-CU may indicate the incoming route on which a packet received by the IAB-node is routed based at least in part on layer-3 header information of the packet. In some aspects, the IAB-donor-CU may include a BAP route ID or BAP path ID or destination BAP address. The destination BAP address may be a BAP address of the IAB-node. In some aspects, The IAB-donor-CU may indicate an ingress backhaul RLC channel. In some aspects, the forwarded packet may carry a new layer-2 header based on the mapping by the routing configuration, e.g., new destination BAP address or BAP path ID or BAP routing ID. In some aspects, the IAB-node may receive a routing configuration for downlink mapping of downstream packets from a first IAB-donor-CU. In some aspects, the IAB-node may receive a routing configuration for uplink mapping of upstream packets from a second IAB-donor-CU. In some aspects, the first IAB-donor-CU and the second IAB-donor-CU may be the same or different. In some aspects, the IAB-donor-CU may provide a routing configuration for downlink mapping of downstream packets and a second routing configuration for uplink mapping of upstream packets.

In some aspects, The IAB-node may receive a routing configuration for downlink mapping of downstream packets and uplink mapping of upstream packets from a first IAB-donor-CU. In some aspects, the IAB-donor-CU may provide a routing configuration to the IAB-node for both downlink mapping of downstream packets and uplink mapping of upstream packets. In some aspects, the IAB-node may be allocated a layer-2 address by a first IAB-donor-CU and may receive the routing configuration from a second IAB-donor-CU. The first IAB-donor-CU and second IAB-donor-CU may the same or different. The IAB-node may receive the routing configuration from the IAB-donor-CU over RRC or F1-C.

Figure 11:
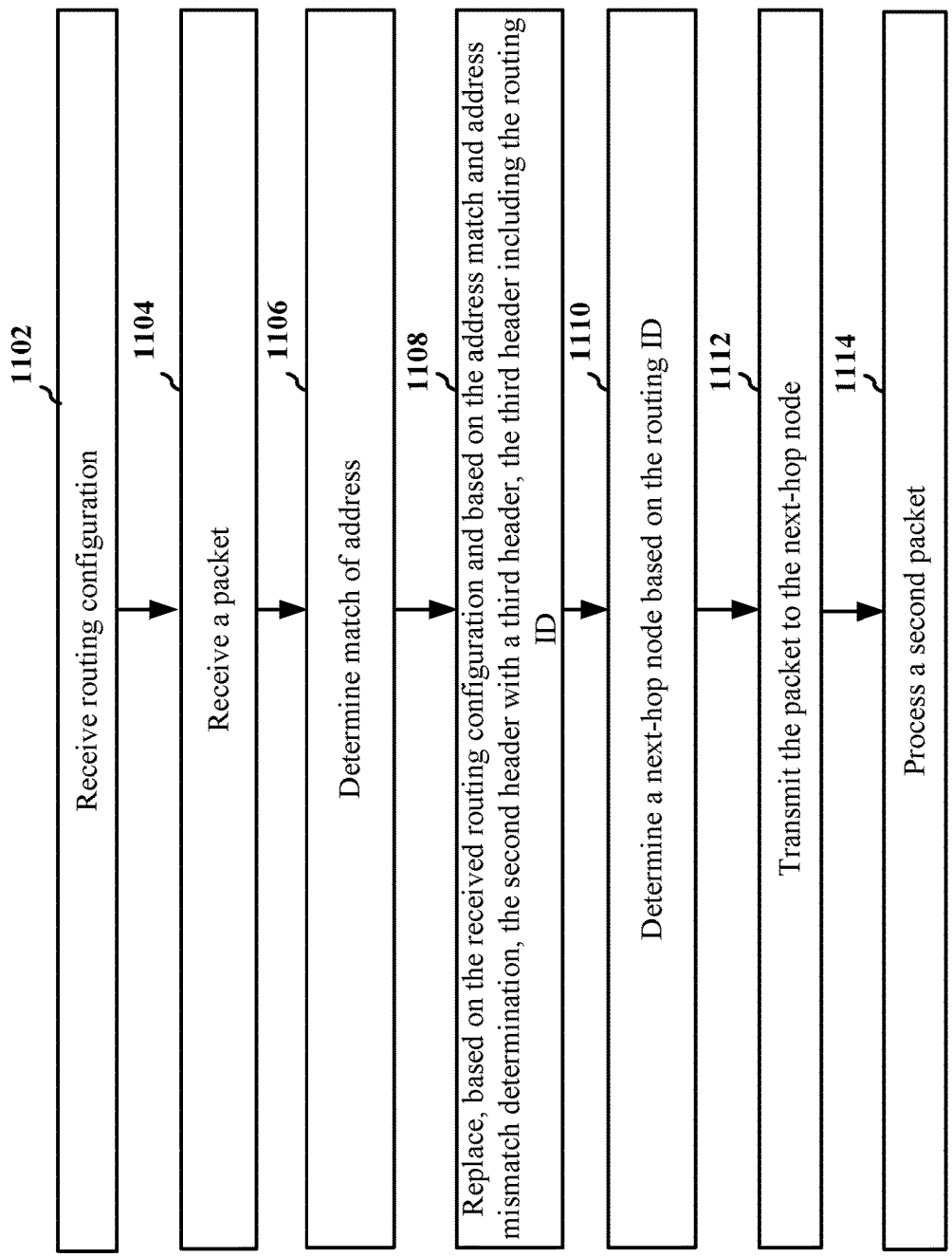
FIG. 11 is a flowchart of a method of wireless communication.

FIG. 11 is a flowchart 1100 of a method of wireless communication. The method may be performed by a first network node (e.g., the base station 102/180; the IAB node 1002; the apparatus 1302).

In some aspects, at 1102, the network node may receive, from a second network node, a routing configuration that maps a packet to a routing identifier (ID) based on a first header in the packet. In some aspects, the routing ID in the third header may comprise at least one of a destination BAP address, a BAP path ID, or a BAP routing ID associated with a node with the first address. In some aspects, the first header may be an IP header, the first address is an IP address, the second header is a BAP header, and the second address is a BAP address. In some aspects, the packet may be one of a downstream packet and the routing configuration may be associated with downlink mapping of downstream packets, or the packet may be an upstream packet and the routing configuration is associated with uplink mapping of upstream packets. In some aspects, the routing configuration from the second network node may be for both downstream packets and upstream packets. In some aspects, the routing configuration may be received through at least one of RRC signaling or F1 control plane (F1-C) signaling. In some aspects, the routing configuration may be based on at least one of a BAP address of the pre-hop node, a BAP routing ID or BAP path ID in the second header, or a backhaul RLC channel between the pre-hop node and the first network node. In some aspects, the routing configuration may comprise a mapping to at least one of a next-hop node, a BAP routing ID, a destination BAP address, a BAP path ID, or a backhaul RLC channel associated with the next-hop node, and the mapping may be based on at least one of the first address or the first header. In some aspects, the first address may be an IP destination address of the packet, and the first header further may include at least one of a differentiated service codepoint (DSCP) field or an IP flow label field.

In some aspects, at 1104, the network node may receive a packet from a pre-hop node, the packet including the first header with a first address and a second header with a second address. In some aspects, the packet may be a BAP packet.

In some aspects, at 1106, the network node may determine that the second address matches an address of the first network node and that the first address mismatches an IP address of the first network node.

In some aspects, at 1108, the network node may replace, based on the received routing configuration and based on the address match and address mismatch determination, the second header with a third header, the third header including the routing ID. In some aspects, the address of the first network node is assigned by a third network node different than the second network node.

In some aspects, at 1110, the network node may determine a next-hop node based on the routing ID.

In some aspects, at 1112, the network node may transmit the packet to the next-hop node.

In some aspects, at 1114, the network node may process a second packet. In some aspects, the network node may receive a second packet with the first header including the first address and the second header including a third address. In some aspects, the network node may determine that the third address mismatches the address of the first network node. In some aspects, the network node may forward, based on the address mismatch determination and without modifying the second packet, the received second packet to a next-hop node based on the third address in the second header, the third address being a second routing ID. In some aspects, the network node may receive a second packet with the first header including a third address and the second header including the second address. In some aspects, the network node may determine that both the third address and the second address match the address of the first network node. In some aspects, the network node may pass, based on the address match determination, the received second packet for upper layer processing.

In some aspects, the routing configuration from the second network node is for one of downstream packets or upstream packets. In some aspects, the network node may receive, from a third network node different than the second network node, a second routing configuration that maps a second packet to a second routing ID based on a first header in the second packet, the second packet including the first header with a third address and the second header with a fourth address. The routing configuration may be for upstream packets and the second routing configuration may be for downstream packets, or the routing configuration may be for downstream packets and the second routing configuration is for upstream packets. In some aspects, the network node may replace, within the second packet based on the received second routing configuration and on a fourth address match and a third address mismatch determination, the second header with the third header, the third header including the second routing ID.

Figure 12:
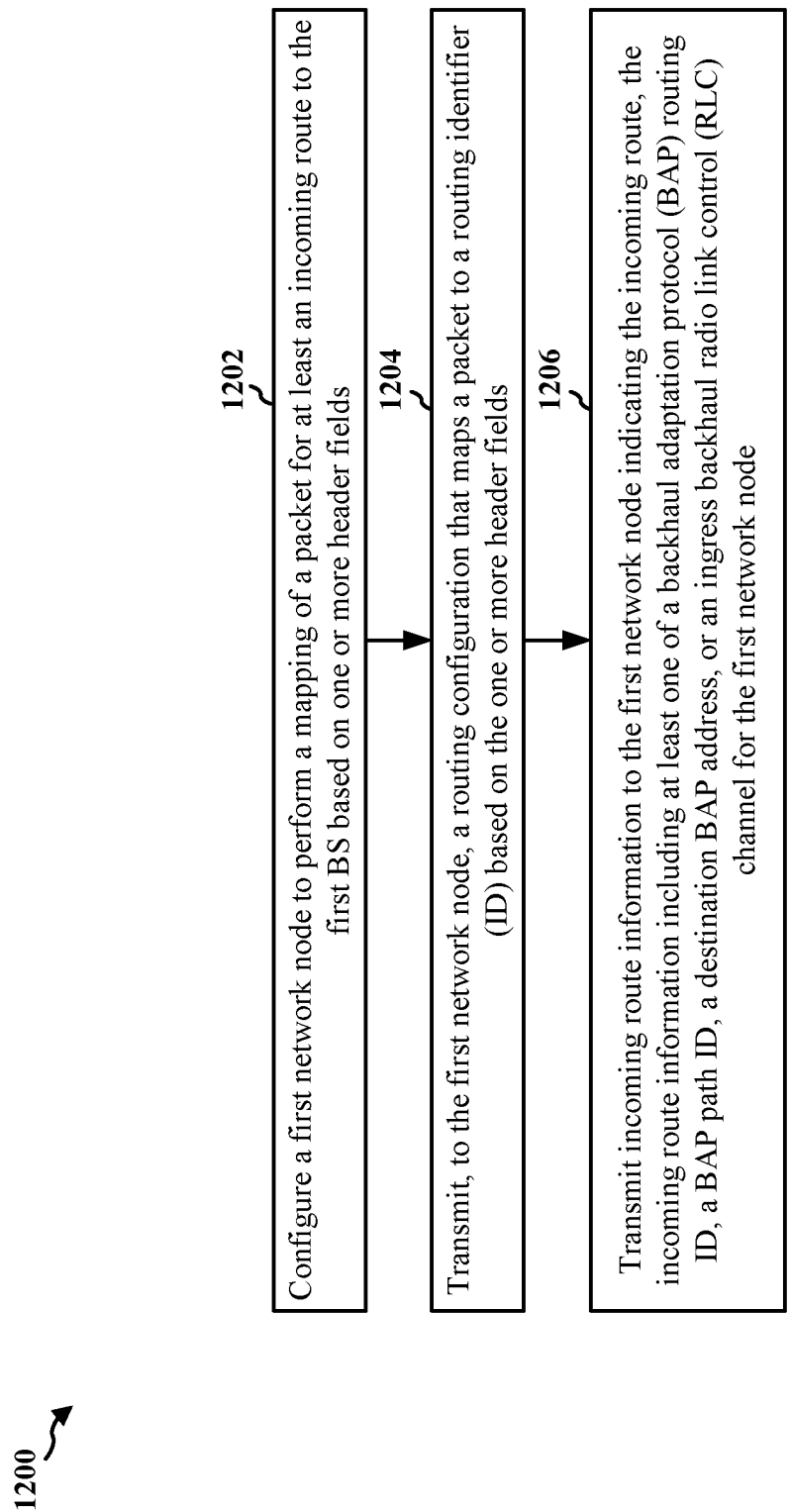
FIG. 12 is a flowchart of a method of wireless communication.

FIG. 12 is a flowchart 1200 of a method of wireless communication. The method may be performed by a second network node (e.g., the base station 102/180; the IAB-donor 1004; the apparatus 1402).

At 1202, the network node may configure a first network node to perform a mapping of a packet for at least an incoming route to the first network node based on one or more header fields.

At 1204, the network node may transmit, to the first network node, a routing configuration that maps a packet to a routing ID based on the one or more header fields.

At 1206, the network node may transmit incoming route information to the first network node indicating the incoming route, the incoming route information including at least one of a BAP routing ID, a BAP path ID, a destination BAP address, or an ingress backhaul RLC channel for the first network node.

Figure 13:
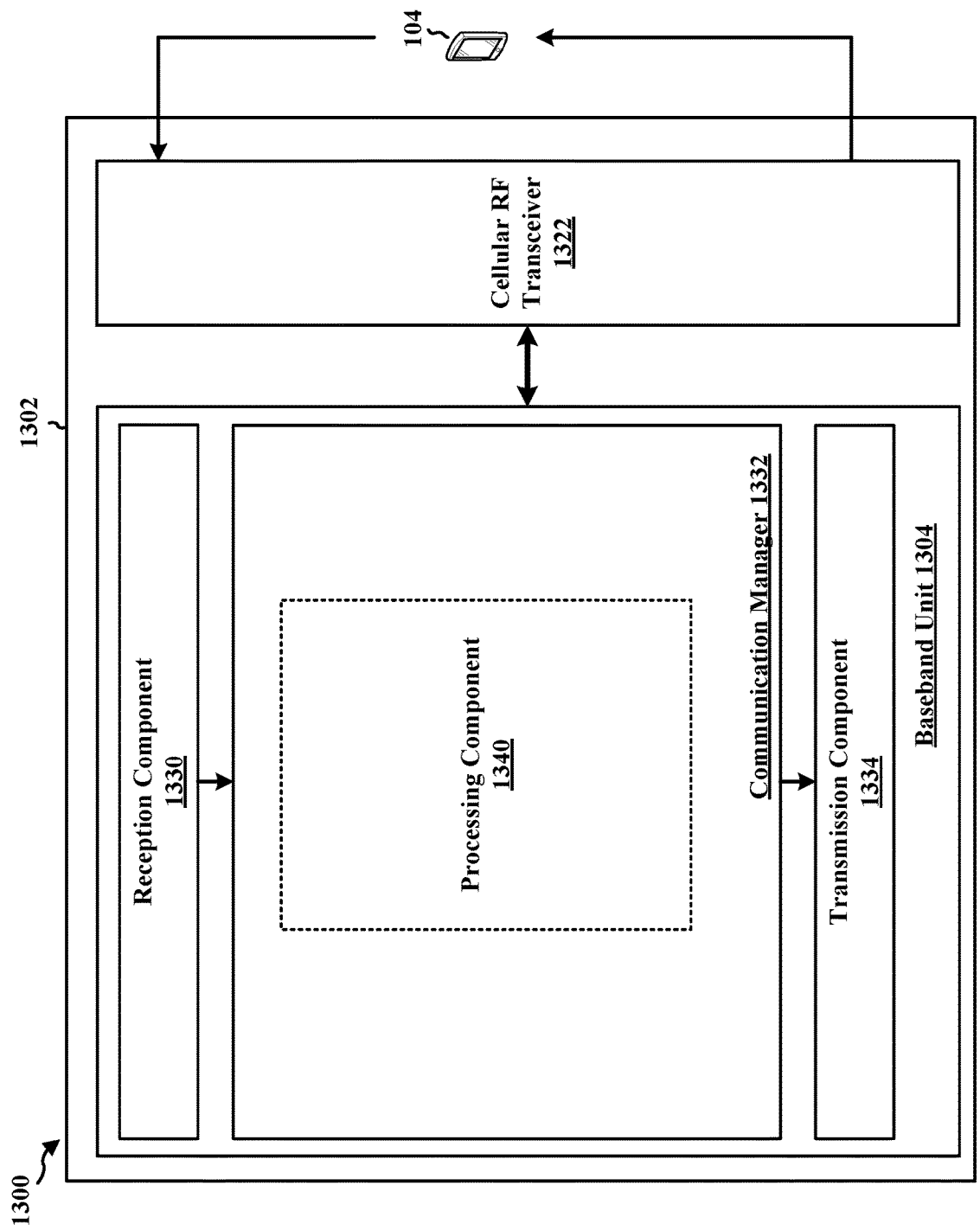
FIG. 13 is a diagram illustrating an example of a hardware implementation for an example apparatus.

FIG. 13 is a diagram 1300 illustrating an example of a hardware implementation for an apparatus 1302. The apparatus 1302 is a network node and includes a baseband unit 1304. The apparatus may be a base station, a component of a base station, or may implement base station functionality. The apparatus may be an IAB node, a component of an IAB node, or may implement IAB node functionality. In some aspects, the apparatus may be referred to as a RAN node or a relay node. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The reception component 1330 and the transmission component 1334 may perform the transmit/send/receive described in connection with blocks in FIG. 11. The communication manager 1332 includes the one or more illustrated components. The components within the communication manager 1332 may be stored in the computer-readable medium/memory and/or configured as hardware within the baseband unit 1304. The baseband unit 1304 may be a component of the wireless device 310 and may include the memory 376 and/or at least one of the TX processor 316, the RX processor 370, and the controller/processor 375.

The communication manager 1332 includes a processing component 1340 that determines that the second address matches an address of the first network node and that the first address mismatches an Internet protocol (IP) address of the first network node, replaces, based on the received routing configuration and based on the address match and address mismatch determination, the second header with a third header, the third header including the routing ID, and determines a next-hop node based on the routing ID, e.g., as described in connection with 1106, 1108, and 1110 of FIG. 11. The processing component 1340 may further determine that the third address mismatches the address of the first network node, determine that both the third address and the second address match the address of the first network node, or replace, within the second packet based on the received second routing configuration and on a fourth address match and a third address mismatch determination, the second header with the third header, the third header including the second routing ID.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for receiving, from a second network node, a routing configuration that maps a packet to a routing ID based on a first header in the packet. The baseband unit 1304 may further include means for receiving a packet from a pre-hop node, the packet including the first header with a first address and a second header with a second address. The baseband unit 1304 may further include means for determining that the second address matches an address of the first network node and that the first address mismatches an IP address of the first network node. The baseband unit 1304 may further include means for replacing, based on the received routing configuration and based on the address match and address mismatch determination, the second header with a third header, the third header including the routing ID. The baseband unit 1304 may further include means for determining a next-hop node based on the routing ID. The baseband unit 1304 may further include means for transmitting the packet to the next-hop node. The baseband unit 1304 may further include means for receiving a second packet with the first header including the first address and the second header including a third address. The baseband unit 1304 may further include means for determining that the third address mismatches the address of the first network node. The baseband unit 1304 may further include means for forwarding, based on the address mismatch determination and without modifying the second packet, the received second packet to a next-hop node based on the third address in the second header, the third address being a second routing ID. The baseband unit 1304 may further include means for receiving a second packet with the first header including a third address and the second header including the second address. The baseband unit 1304 may further include means for determining that both the third address and the second address match the address of the first network node. The baseband unit 1304 may further include means for passing, based on the address match determination, the received second packet for upper layer processing. The baseband unit 1304 may further include means for receiving, from a third network node different than the second network node, a second routing configuration that maps a second packet to a second routing ID based on a first header in the second packet, the second packet including the first header with a third address and the second header with a fourth address. The baseband unit 1304 may further include means for replacing, within the second packet based on the received second routing configuration and on a fourth address match and a third address mismatch determination, the second header with the third header, the third header including the second routing ID.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
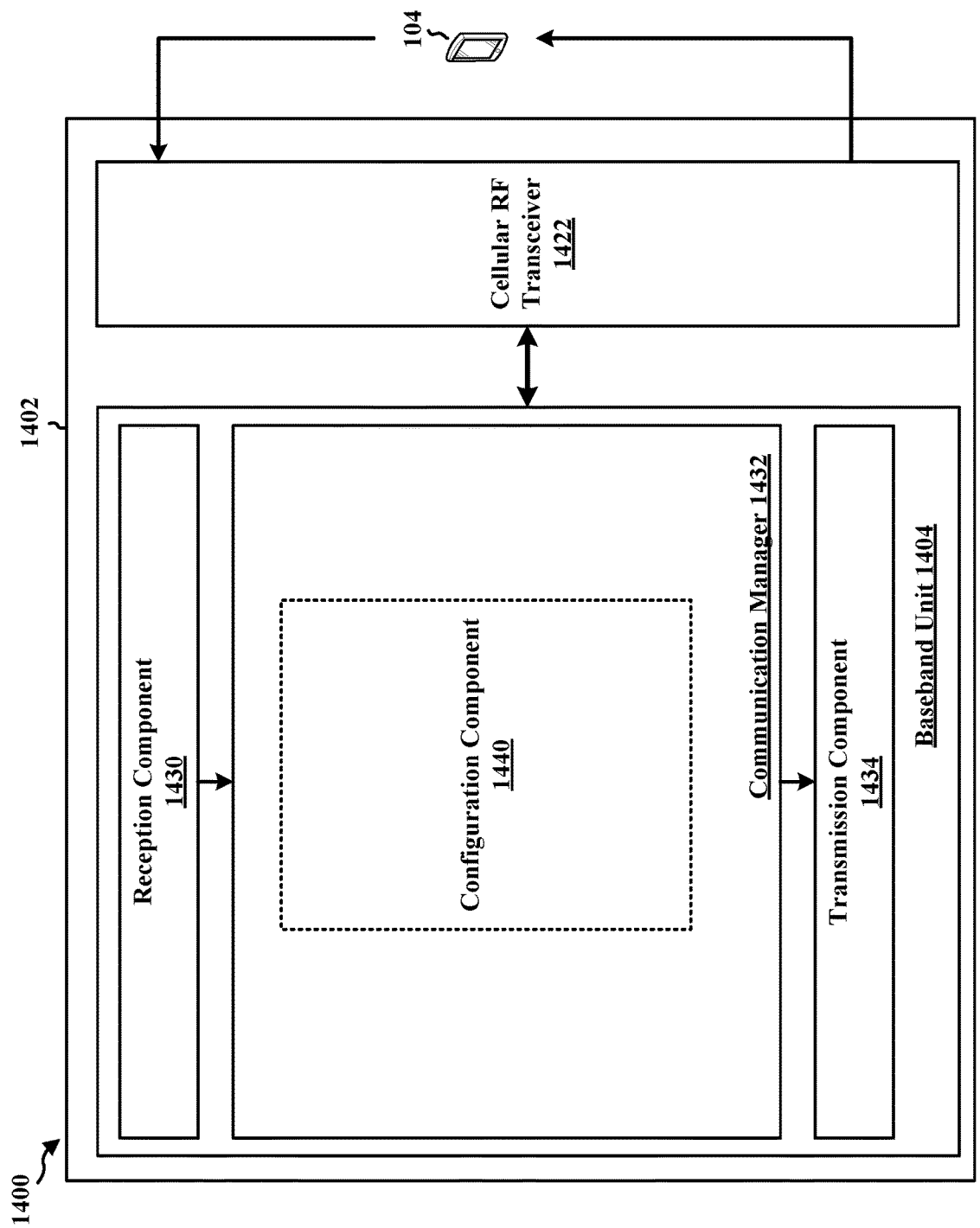
FIG. 14 is a diagram illustrating an example of a hardware implementation for an example apparatus.

FIG. 14 is a diagram 1400 illustrating an example of a hardware implementation for an apparatus 1402. The apparatus 1402 is a network node and includes a baseband unit 1404. The apparatus may be a base station, a component of a base station, or may implement base station functionality. The apparatus may be an IAB node, a component of an IAB node, or may implement IAB node functionality. In some aspects, the apparatus may be referred to as a RAN node or a relay node. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The reception component 1430 and the transmission component 1434 may perform the transmit/send/receive described in connection with blocks in FIG. 12. The communication manager 1432 includes the one or more illustrated components. The components within the communication manager 1432 may be stored in the computer-readable medium/memory and/or configured as hardware within the baseband unit 1404. The baseband unit 1404 may be a component of the wireless device 310 and may include the memory 376 and/or at least one of the TX processor 316, the RX processor 370, and the controller/processor 375.

The communication manager 1432 includes a configuration component 1440 that configures a first network node to perform a mapping of a packet for at least an incoming route to the first network node based on one or more header fields, e.g., as described in connection with 1202 of FIG. 12.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for configuring a first network node to perform a mapping of a packet for at least an incoming route to the first network node based on one or more header fields. The baseband unit 1404 further includes means for transmitting, to the first network node, a routing configuration that maps a packet to a routing ID based on the one or more header fields. The baseband unit 1404 further includes means for transmitting incoming route information to the first network node indicating the incoming route, the incoming route information including at least one of a BAP routing ID, a BAP path ID, a destination BAP address, or an ingress backhaul RLC channel for the first network node.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of communication of a first network node, comprising: receiving, from a second network node, a routing configuration that maps a packet to a routing ID based on a first header in the packet; receiving the packet from a pre-hop node, the packet including the first header with a first address and a second header with a second address; determining that the second address matches an address of the first network node and that the first address mismatches an IP address of the first network node; and replacing, based on the received routing configuration and based on an address match to the address of the first network node and an address mismatch of the IP address of the first network node, the second header with a third header, the third header including the routing ID.

Aspect 2 is the method of aspect 1, further comprising: determining a next-hop node based on the routing ID; and transmitting the packet to the next-hop node.

Aspect 3 is the method of aspects 1-2, wherein the routing ID in the third header comprises at least one of a destination BAP address, a BAP path ID, or a BAP routing ID associated with a node with the first address.

Aspect 4 is the method of aspects 1-3, wherein the first header is an IP header, the first address is an IP address, the second header is a BAP header, and the second address is a BAP address.

Aspect 5 is the method of aspects 1-4, wherein the packet is one of a downstream packet and the routing configuration is associated with downlink mapping of downstream packets, or the packet is an upstream packet and the routing configuration is associated with uplink mapping of upstream packets.

Aspect 6 is the method of aspects 1-5, further comprising: receiving a second packet with the first header including the first address and the second header including a third address; determining that the third address mismatches the address of the first network node; and forwarding, based on the address mismatch determination and without modifying the second packet, the received second packet to a next-hop node based on the third address in the second header, the third address being a second routing ID.

Aspect 7 is the method of aspects 1-6, further comprising: receiving a second packet with the first header including a third address and the second header including the second address; determining that both the third address and the second address match the address of the first network node; and passing, based on the address match, the received second packet for upper layer processing.

Aspect 8 is the method of aspects 1-7, wherein the routing configuration comprises a mapping to at least one of a next-hop node, a BAP routing ID, a destination BAP address, a BAP path ID, or a backhaul RLC channel associated with the next-hop node, and the mapping is based on at least one of the first address or the first header.

Aspect 9 is the method of aspects 1-8, wherein the first address is an IP destination address of the packet, and the first header further includes at least one of a DSCP field or an IP flow label field.

Aspect 10 is the method of aspects 1-9, wherein the routing configuration is based on at least one of a BAP address of the pre-hop node, a BAP routing ID or BAP path ID in the second header, or a backhaul RLC channel between the pre-hop node and the first network node.

Aspect 11 is the method of aspects 1-10, wherein the routing configuration is received through at least one of RRC signaling or F1-C signaling.

Aspect 12 is the method of aspects 1-11, wherein the routing configuration from the second network node is for both downstream packets and upstream packets.

Aspect 13 is the method of aspects 1-12, wherein the routing configuration from the second network node is for one of downstream packets or upstream packets, the method further comprising: receiving, from a third network node different than the second network node, a second routing configuration that maps a second packet to a second routing ID based on a fourth header in the second packet, the second packet including a fifth header with a third address and the fifth header with a fourth address, wherein the routing configuration is for the upstream packets and the second routing configuration is for downstream packets, or the routing configuration is for downstream packets and the second routing configuration is for upstream packets; and replacing, within the second packet based on the received second routing configuration and on a fourth address match and a third address mismatch determination, the fifth header with a sixth header, the sixth header including the second routing ID.

Aspect 14 is the method of aspects 1-13, wherein the packet is a BAP packet.

Aspect 15 is the method of aspects 1-14, wherein the address of the first network node is assigned by a third network node different than the second network node.

Aspect 16 is a method of communication of a second network node, comprising: configuring a first network node to perform a mapping of a packet for at least an incoming route to the first network node based on one or more header fields; and transmitting, to the first network node, a routing configuration that maps a packet to a routing ID based on the one or more header fields.

Aspect 17 is the method of aspects 16, wherein the one or more header fields includes an IP header.

Aspect 18 is the method of aspects 16-17, further comprising transmitting incoming route information to the first network node indicating the incoming route, the incoming route information including at least one of a BAP routing ID, a BAP path ID, a destination BAP address, or an ingress backhaul RLC channel for the first network node.

Aspect 19 is an apparatus comprising a memory and at least one processor coupled to the memory and configured to perform any of aspects 1-15, and a transceiver coupled to the at least one processor.

Aspect 20 is an apparatus comprising a memory and at least one processor coupled to the memory and configured to perform any of aspects 16-18, and a transceiver coupled to the at least one processor.

Aspect 21 is an apparatus comprising means for performing any of aspects 1-15.

Aspect 22 is an apparatus comprising means for performing any of aspects 16-18.

Aspect 23 is a computer-readable medium storing computer executable code, where the code when executed by a processor causes the processor to perform any of aspects 1-15.

Aspect 24 is a computer-readable medium storing computer executable code, where the code when executed by a processor causes the processor to perform any of aspects 16-18.

What is claimed is:

1. An apparatus for wireless communication at a first network node, comprising:
    memory; and
    at least one processor coupled to the memory and configured to:
        receive, from a second network node, a routing configuration that maps a packet to a routing identifier (ID) based on a first header in the packet;
        receive the packet from a pre-hop node, the packet including the first header with a first address and a second header with a second address;
        determine that the second address matches an address of the first network node and that the first address mismatches an Internet Protocol (IP) address of the first network node, wherein the first address is an IP address and the second address is a backhaul adaptation protocol (BAP) address; and
        replace, based on the received routing configuration and based on an address match to the address of the first network node and an address mismatch of the IP address of the first network node, the second header with a third header, the third header including the routing ID.

2. The apparatus of claim 1, wherein the at least one processor is further configured to:
    determine a next-hop node based on the routing ID; and
    transmit the packet to the next-hop node.

3. The apparatus of claim 1, wherein the routing ID in the third header comprises at least one of a destination BAP address, a BAP path identifier (ID), or a BAP routing ID associated with a node with the first address.

4. The apparatus of claim 1, wherein the first header is an IP header and the second header is a BAP header.

5. The apparatus of claim 1, wherein the packet is one of a downstream packet and the routing configuration is associated with downlink mapping of downstream packets, or the packet is an upstream packet and the routing configuration is associated with uplink mapping of upstream packets.

6. The apparatus of claim 1, wherein the at least one processor is further configured to:
    receive a second packet with the first header including the first address and the second header including a third address;
    determine that the third address mismatches the address of the first network node; and
    forward, based on the address mismatch and without modifying the second packet, the received second packet to a next-hop node based on the third address in the second header, the third address being a second routing ID.

7. The apparatus of claim 1, wherein the at least one processor is further configured to:
    receive a second packet with the first header including a third address and the second header including the second address;
    determine that both the third address and the second address match the address of the first network node; and
    pass, based on the address match, the received second packet for upper layer processing.

8. The apparatus of claim 1, wherein the routing configuration comprises a mapping to at least one of a next-hop node, a BAP routing ID, a destination BAP address, a BAP path ID, or a backhaul radio link control (RLC) channel associated with the next-hop node, and the mapping is based on at least one of the first address or the first header.

9. The apparatus of claim 8, wherein the first address is an IP destination address of the packet, and the first header further includes at least one of a differentiated service codepoint (DSCP) field or an IP flow label field.

10. The apparatus of claim 1, wherein the routing configuration is based on at least one of a BAP address of the pre-hop node, a BAP routing ID or BAP path ID in the second header, or a backhaul radio link control (RLC) channel between the pre-hop node and the first network node.

11. The apparatus of claim 1, wherein the routing configuration is received through at least one of radio resource control (RRC) signaling or F1 control plane (F1-C) signaling.

12. The apparatus of claim 1, wherein the routing configuration from the second network node is for both downstream packets and upstream packets.

13. The apparatus of claim 1, wherein the routing configuration from the second network node is for one of downstream packets or upstream packets, the at least one processor is further configured to:
    receive, from a third network node different than the second network node, a second routing configuration that maps a second packet to a second routing ID based on a fourth header in the second packet, the second packet including the fourth header with a third address and a fifth header with a fourth address, wherein the routing configuration is for the upstream packets and the second routing configuration is for the downstream packets, or the routing configuration is for the downstream packets and the second routing configuration is for the upstream packets; and
    replace, within the second packet based on the received second routing configuration and on a fourth address match and a third address mismatch determination, the fifth header with a sixth header, the sixth header including the second routing ID.

14. The apparatus of claim 1, wherein the packet is a BAP packet.

15. The apparatus of claim 1, wherein the address of the first network node is assigned by a third network node different than the second network node.

16. The apparatus of claim 1, further comprising a transceiver coupled to the at least one processor.

17. An apparatus for wireless communication of a second base station, comprising:
  memory; and
    at least one processor coupled to the memory and configured to:
      configure a first network node to perform a mapping of a packet for at least an incoming route to the first network node based on one or more header fields, wherein the one or more header fields comprise a first header associated with an Internet protocol (IP) address and a second header associated with a first backhaul adaptation protocol (BAP) address;
      transmit incoming route information to the first network node indicating the incoming route, the incoming route information including at least one of a BAP routing ID, a BAP path ID, a destination BAP address, or an ingress backhaul radio link control (RLC) channel for the first network node, wherein the mapping is based on the incoming route information and layer 3 header information; and
      transmit, to the first network node, a routing configuration that maps the packet to a routing identifier (ID) based on the one or more header fields and the layer 3 header information.

18. The apparatus of claim 17, further comprising a transceiver coupled to the at least one processor.

19. A method of communication at a first network node, comprising:
  receiving, from a second network node, a routing configuration that maps a packet to a routing identifier (ID) based on a first header in the packet;
  receiving a packet from a pre-hop node, the packet including the first header with a first address and a second header with a second address;
  determining that the second address matches an address of the first network node and that the first address mismatches an Internet protocol (IP) address of the first network node, wherein the first address is an IP address and the second address is a backhaul adaptation protocol (BAP) address; and
  replacing, based on the received routing configuration and based on an address match to the address of the first network node and an address mismatch to the IP address of the first network node, the second header with a third header, the third header including the routing ID.

20. The method of claim 19, further comprising:
  determining a next-hop node based on the routing ID; and
  transmitting the packet to the next-hop node.

21. The method of claim 19, wherein the routing ID in the third header comprises at least one of a destination BAP address, a BAP path identifier (ID), or a BAP routing ID associated with a node with the first address.

22. The method of claim 19, wherein the first header is an IP header and the second header is a BAP.

23. The method of claim 19, wherein the packet is one of a downstream packet and the routing configuration is associated with downlink mapping of downstream packets, or the packet is an upstream packet and the routing configuration is associated with uplink mapping of upstream packets.

24. The method of claim 19, further comprising:
  receiving a second packet with the first header including the first address and the second header including a third address;
  determining that the third address mismatches the address of the first network node; and
  forwarding, based on the address mismatch and without modifying the second packet, the received second packet to a next-hop node based on the third address in the second header, the third address being a second routing ID.

25. The method of claim 19, further comprising:
  receiving a second packet with the first header including a third address and the second header including the second address;
  determining that both the third address and the second address match the address of the first network node; and
  passing, based on the address match, the received second packet for upper layer processing.

26. The method of claim 19, wherein the routing configuration comprises a mapping to at least one of a next-hop node, a BAP routing ID, a destination BAP address, a BAP path ID, or a backhaul radio link control (RLC) channel associated with the next-hop node, and the mapping is based on at least one of the first address or the first header.

27. The method of claim 26, wherein the first address is an IP destination address of the packet, and the first header further includes at least one of a differentiated service codepoint (DSCP) field or an IP flow label field.

28. A method of communication of a second network node, comprising:
  configuring a first network node to perform a mapping of a packet for at least an incoming route to the first network node based on one or more header fields, wherein the one or more header fields comprise a first header associated with an Internet protocol (IP) address and a second header associated with a first backhaul adaptation protocol (BAP) address;
  transmitting incoming route information to the first network node indicating the incoming route, the incoming route information including at least one of a BAP ID, a BAP path ID, a destination BAP address, or an ingress backhaul radio link control (RLC) channel for the first network node, wherein the mapping is based on the incoming route information and layer 3 header information; and
  transmitting, to the first network node, a routing configuration that maps the packet to a routing identifier (ID) based on the one or more header fields and the layer 3 header information.

* * * * *